United States Patent [19]

Spear

[11] Patent Number: 5,517,492

[45] Date of Patent: May 14, 1996

[54] INCREASED SPEECH INTERLEAVE WITH REDUCED DELAY

[75] Inventor: Stephen Spear, Skokie, Ill.

[73] Assignee: Motorola, Inc., Schaumburg, Ill.

[21] Appl. No.: 822,357

[22] Filed: Jan. 17, 1992

[51] Int. Cl.⁶ .......................... H04L 5/14; H04B 7/212; H04B 1/56
[52] U.S. Cl. .......................... 370/29; 370/95.1
[58] Field of Search .................. 370/24, 29, 77, 370/109, 30, 50, 69.1, 95.3, 95.1

[56] References Cited

U.S. PATENT DOCUMENTS

| | | | |
|---|---|---|---|
| 4,267,592 | 5/1981 | Craiglow | 370/109 |
| 4,287,588 | 9/1981 | Segner | 370/29 |
| 4,559,625 | 12/1985 | Berlekamp et al. | 371/2.1 |
| 4,868,811 | 9/1989 | Suzuki | 370/50 |
| 5,124,985 | 6/1992 | Hoshikawa | 370/29 |
| 5,191,576 | 3/1993 | Pommier et al. | 370/50 |

FOREIGN PATENT DOCUMENTS

| | | |
|---|---|---|
| 0112697 | 12/1983 | European Pat. Off. . |
| 0284089 | 3/1988 | European Pat. Off. . |

*Primary Examiner*—Benedict V. Safourek
*Attorney, Agent, or Firm*—Raymond J. Warren; Anthony G. Sitko

[57] ABSTRACT

In a TDM readiotelephone network, there is provided a mechanism for introducing link asymmetry between an uplink and a downlink, paired frame alternation on the uplink and downlink and bandwidth multiplexing/sharing/apportionment within and among successive frames. The result is increased interleaving depth and a reduction in round-trip delay from the traditional half-rate speech coding approaches.

8 Claims, 2 Drawing Sheets

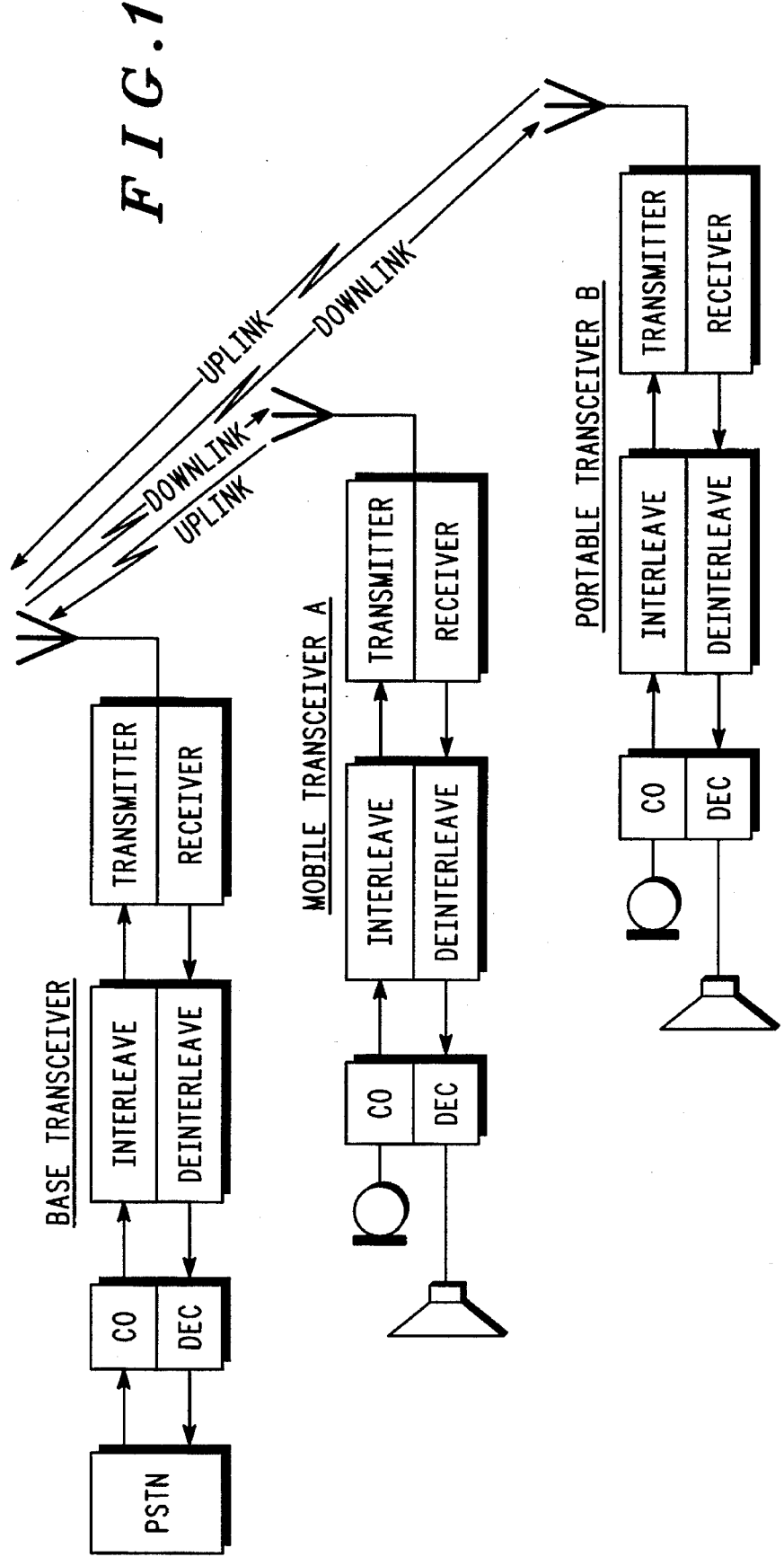

INCREASED SPEECH INTERLEAVE WITH REDUCED DELAY

FIELD OF THE INVENTION

This invention is concerned with radio transmission of digitized speech.

More particularly, this invention concerns interleaving, with reduced delay, half-rate coded speech for radiotelephony transmission.

BACKGROUND OF THE INVENTION

Today's digital radiotelephone systems are designed for full-rate coded speech while envisioning half-rate coded speech as advances are made in speech coding technology. Three such systems are the GSM, Pan-European Digital Cellular system, the US Digital Cellular system (IS-54) and the Japan Digital Cellular system, all Time Division Multiple Access (TDMA) radiotelephone systems.

The GSM system, for example, was designed around a full-rate speech coding technique where each (20 ms) block of (continuous) speech is digitized and error encoded for radio transmission in a repeating TDM time slot over eight frames—a so-called interleave depth of eight. In other words, it takes eight frames to recover all segment of the original 20 ms block of speech. The transmission bit rate and frame length is such that the delay between the speech being spoken and being received and reconstructed (actually, the complete round-trip delay) is virtually imperceptible. If the interleave depth were much greater, the delay would become annoying and the conversation would not be perceived to be taking place in "real time." If the interleave depth were much shorter, the delay would become inconsequential, but more than 12.5% (one-eighth) would be lost every time that one frame of information was corrupted. This would be perceived as poor audio quality.

To increase the capacity of these TDMA systems, technologists continue to pursue ways to encode speech at lower and lower bit rates. If the speech could be encoded into half the number of bits, twice as many users could be accommodated in the same radio spectrum. These systems traditionally envision such half-rate encoded speech and anticipate the availability of this half-rate speech coding in their system designs. Typically, as in the GSM system, it is envisioned that while the full-rate user will use every frame for speech transmission, the half-rate user will use every other, alternate frame for its transmissions. This permits another half-rate user to use the intervening, alternate frames, thereby doubling the system capacity. Unfortunately, the use of every other frame has the interrelated effects of either lengthening the delay or reducing the interleaving depth (where the loss of a single frame results in the loss of a proportionately higher mount of intelligible speech).

This invention takes as its object to overcome these shortcomings and to realize certain advantages presented below.

SUMMARY OF THE INVENTION

In a TDM radiotelephone network, there is provided a mechanism for introducing link asymmetry, paired frame alternation and bandwidth multiplexing/sharing/apportionment. The result is increased interleaving depth and a reduction in round-trip delay from the traditional half-rate speech coding approaches.

A radio transceiver, on the downlink side, provides for: receiving from a communications channel, frames of encoded speech that has been information bandwidth multiplexed with that of others logically sharing the same channel; demultiplexing from that of others logically sharing the same channel, that information bandwidth allocated to the recipient; and decoding for audio reproduction that encoded speech so demultiplexed from that of others.

The transceiver, on the uplink side, provides for: encoding speech; interleaving with those of others logically sharing the same channel the speech so encoded into successive frames logically concatenated in time; and transmitting to a communications channel successive frames of encoded speech so interleaved.

BRIEF DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which:

FIG. 1 is a functional block diagram of the network and apparatus in which the preferred embodiment of the invention operates.

DETAILED DESCRIPTION

FIG. 1 is a functional block diagram of the network and apparatus in which the preferred embodiment of the invention operates.

FIG. 1 illustrates the relevant parts of a GSM cellular radiotelephone network. It illustrates an exemplary fixed network transceiver in communication with exemplary mobile (and portable) transceivers on paired, full duplex (TDM) radio links.

In full-rate operation (in either direction), the microphone (MIC) captures (or the Public Switched Telephone Network provides) speech and the Coder (CoDec) encodes 20 ms blocks of speech at 13 kbps (22.8 kbps with error protection). The Interleaver controls the transmitter (Tx) to interleave the 20 ms of encoded speech (along with redundant error protecting information) into a recurrent time slot over eight Time Division Multiplexed (TDM) frames. The encoded and interleaved speech is transmitted (Tx) under timing control imposed by the Interleaver by one and received (Rx) by the other transceiver (Tx/Rx), deinterleaved by the Deinterleaver and reproduced as reconstructed audio at the speaker by the Decoder (CoDec) using the redundant error protection information to reconstruct any speech frames that could not be recovered from the transmission channel.

Figure 2A:
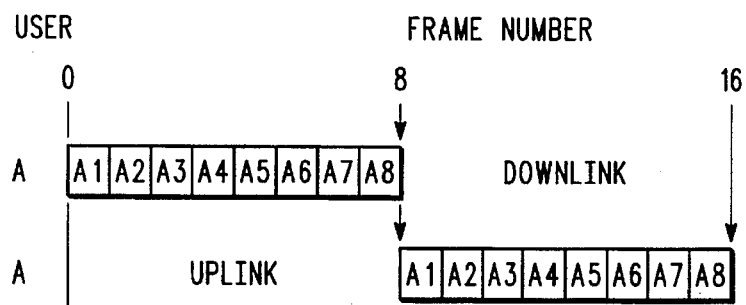
FIG. 2 is a time domain diagram of the radio links of FIG. 1.
Figure 2B:
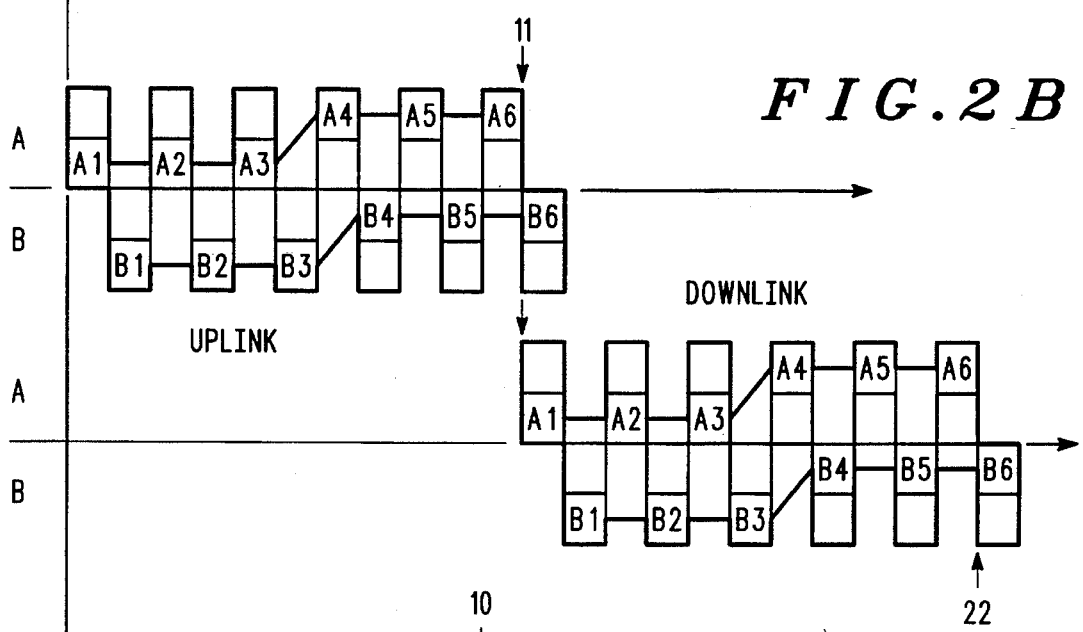
Figure 2C:
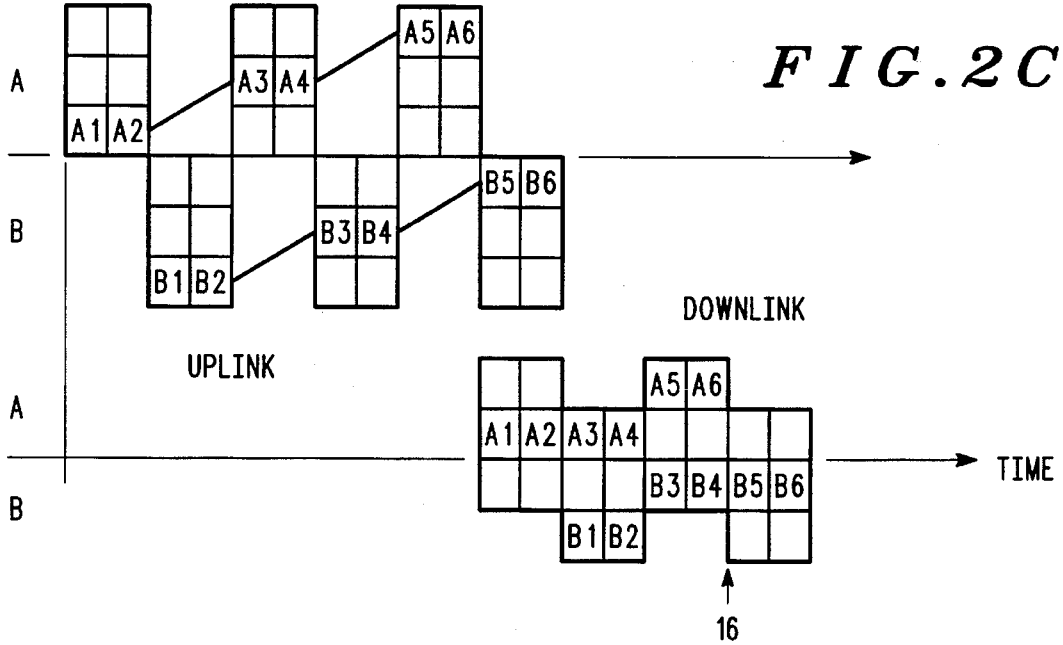

FIGS. 2A, 2B and 2C are is a time domain diagram of the radio links of FIG. 1.

FIG. 2 illustrates the same one (of several) of those regularly repeating time slots in each successive frame over a number of frames (0–22). That time slot in each frame contains successive segments that comprise the interleaved 20 ms speech blocks of one (A) or more (B) users.

FIG. 2a Illustrates 22.8 kbps, full-rate coded speech at interleave depth 8 (eight speech segments) where the first 20 ms of speech is recoverable with an 8 frame delay at frame 8 and another 8 frame delay for the downlink for a total round-trip delay of 16 frames. Only one full-duplex user per time slot, namely User A, can be accommodated on the paired channel. If half-rate coded speech at 11.4 kbps were to be transmitted in every other frame, User A would transmit in frames 2, 4, 6 & 8 while User B would transmit in frames 1, 3, 5 & 7. There would be no increase in round-trip delay. However, this interleave depth of 4 would mean an intolerable information loss of one-in-four (or 25%) if just one frame were corrupted and unrecoverable.

FIG. 2b illustrates a depth 4 interleaver according to the GSM half-rate coding recommendation, but conceptually extrapolated to depth 6. Each 20 ms block of speech would be segmented into six segments (A1–A6 for User A) and each time slot per frame would carry one segment from the current 20 ms speech block and one segment from a previous 20 ms speech block. All six segments (e.g., A1–A6) from the same 20 ms speech block are shown by dotted interconnection. Typically, User A and User B alternate frames, resulting in the capacity doubling of the system. Under this hypothetical extrapolation, frame erasures would result in an acceptable loss of one-in-six (or 17%) of the encoded speech. However, the round-trip delay would increase unacceptably from that anticipated in the system design of 16 to now 22 frames.

FIG. 2c illustrates increased interleaving (depth 6) with reduced delay according to the invention. In accordance with the invention, each half-rate time slot on the uplink carries one of six segments from the current 20 ms speech block, one from the previous speech block and one from the block before it. Rather than allocating frames alternately between User A and User B, alternate PAIRS of frames are allocated, two to A and then two to B. This results in the entire 20 ms speech block being available for reproduction one frame earlier than in the usual case illustrated in FIG. 2b.

To maintain the round-trip delay objective, the downlink is formatted asymmetrically from the uplink, which is quite irregular in TDMA system designs. On the downlink, also illustrated in FIG. 2c, in addition to pairing the frame allocations as in the uplink, the time slot of each frame is allocated between Users A and B in alternating one-third/ two-thirds proportions. This might be thought of as multiplexing the information bandwidth of a single TDM time slot between users (e.g., signals from users are interleaved and transmitted within a single TDM time slot). The implication is that both users (A & B) must receive all frames and demultiplex that portion of the information bandwidth allocated to it. In fact, this entire scheme might be thought of as a logical three fold increase in the number of "time slots" per frame; the "time slot" assignment algorithm, however, would be quite complex viewed that way.

Nevertheless, bandwidth-multiplexed as it is, it is to be noted that the resultant round-trip delay for half-rate coding has now been reduced from 22 frames to 16 frames—the delay for which the system was originally designed—and is no worse than the delay for the full-rate coder. Utilization of these techniques—link asymmetry, paired frame alternation and bandwidth multiplexing/sharing/apportionment—results in increased interleaving depth and a reduction in round-trip delay from the traditional half-rate approach.

It is to be noted that it is well understood by those skilled in this field how to implement the the GSM recommendation of FIG. 2b, for example, in the interleaver of FIG. 1 with a reconfigureable processor like Motorola's DSP 56000. It will be equally well within the competence of such an individual, without undue experimentation, to implement the teachings contained herein in such a processor. Deinterleaving (and demultiplexing) is simply the process exactly complimentary to the process of interleaving (or multiplexing, respectively) and is similarly realized.

Aside from providing robust error performance of half-rate encoded speech by increasing the interleave depth while reducing delay, another attendant advantage of this invention also includes the benefit that the two half-rate users (A & B) are offset by 10 ms, thereby distributing some of the real time processing demands placed upon the network.

Thus, in a TDM radiotelephone network, there has been provided a mechanism for introducing link asymmetry, paired frame alternation and bandwidth multiplexing/sharing/apportionment. The result is increased interleaving depth and a reduction in round-trip delay from the traditional half-rate speech coding approaches.

While the preferred embodiment of the invention has been described and shown, it will be appreciated by those skilled in this field that other variations and modifications of this invention may be implemented.

These and all other variations and adaptations are expected to fall within the ambit of the appended claims.

I claim:

1. A transmitter apparatus comprising, operatively coupled in series:

means for encoding speech from a user, means for interleaving with encoded speech of others logically sharing a communications channel, speech so encoded into alternate pairs of frames of encoded speech, and means for transmitting to the communications channel successive frames of encoded speech so interleaved.

2. The apparatus as in claim 1 wherein each frame comprises a plurality of segments and the means for interleaving is further operable for interleaving the encoded speech and the encoded speech of other into the segments within each frame.

3. The apparatus as in claim 2 wherein the means for interleaving is further operable to interleave the encoded speech and the encoded speech of others into the segments in alternating one-third, two-thirds proportions.

4. The apparatus as in claim 1 wherein the communications channel constitutes a repeating time slot in a Time Division Multiplexed radiotelephone system.

5. A receiver apparatus comprising, operatively coupled in series:

means for receiving for a recipient from a communications channel frames of encoded speech that have been interleaved in alternating pairs with frames of encoded speech of others logically sharing the communications channel, means for demultiplexing from the frames of encoded speech of others logically sharing the communications channel, the frames of encoded speech of the recipient, and means for decoding for audio reproduction the frames of encoded speech of the recipient.

6. The apparatus as in claim 5 wherein the channel constitutes a repeating time slot in a Time Division Multiplexed radiotelephone system.

7. A radio transceiver comprising:

a receive portion having, operatively coupled in series:

means for receiving for a user from a communications channel frames of encoded speech that are interleaved in alternate pairs with flames of others logically sharing the communications channel, means for demultiplexing from the frames of others logically sharing the communications channel, the frames of encoded speech for the user, and means for decoding for audio reproduction the frames of encoded speech for the user, and a transmit portion having, operatively coupled in series:

means for encoding speech from the user, means for interleaving with encoded speech of others logically sharing the communications channel, speech so encoded into alternate pairs of frames of encoded speech;

and means for transmitting to a communications channel successive frames of encoded speech so interleaved.

8. A method of transmitting and receiving encoded speech comprising:

receiving for a user from a communications channel frames of encoded speech that are interleaved in alternate pairs with frames of others logically sharing the communications channel, demultiplexing from the frames of others logically sharing the communications channel, the frames of encoded speech for the user, and decoding for audio reproduction the frames of encoded speech for the user, and encoding speech from the user, interleaving with encoded speech of others logically sharing the communications channel, speech so encoded into alternate pairs of frames of encoded speech, and transmitting to a communications channel successive frames of encoded speech so interleaved.

\* \* \* \* \*